US009671008B2

(12) United States Patent
Minaminakamichi

(10) Patent No.: US 9,671,008 B2
(45) Date of Patent: Jun. 6, 2017

(54) OIL SUCTION DEVICE FOR VEHICLE

(71) Applicant: HONDA MOTOR CO., LTD., Tokyo (JP)

(72) Inventor: Takashi Minaminakamichi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 132 days.

(21) Appl. No.: 14/782,163

(22) PCT Filed: Mar. 25, 2014

(86) PCT No.: PCT/JP2014/058360
§ 371 (c)(1),
(2) Date: Oct. 2, 2015

(87) PCT Pub. No.: WO2014/167996
PCT Pub. Date: Oct. 16, 2014

(65) Prior Publication Data
US 2016/0061313 A1 Mar. 3, 2016

(30) Foreign Application Priority Data

Apr. 12, 2013 (JP) ................................. 2013-083978

(51) Int. Cl.
F16H 57/04 (2010.01)
F04C 2/10 (2006.01)
F04C 15/06 (2006.01)

(52) U.S. Cl.
CPC ........... *F16H 57/0409* (2013.01); *F04C 2/10* (2013.01); *F04C 15/06* (2013.01);
(Continued)

(58) Field of Classification Search
CPC .... F16H 57/0409; F16H 57/0436; F04C 2/10; F04C 15/06; F04C 2210/206; F04C 2270/03

See application file for complete search history.

(56) References Cited

U.S. PATENT DOCUMENTS 2,601,894 A * 7/1952 Morse ................. G01F 23/0007
137/582
4,329,952 A * 5/1982 Buraas ................... F01M 5/002
123/142.5 R (Continued)

FOREIGN PATENT DOCUMENTS

JP 61-226524 A 10/1986
JP 07-233787 A 9/1995

(Continued)

OTHER PUBLICATIONS

International Search Report dated Jun. 24, 2014 corresponding to International Patent Application No. PCT/JP2014/058360 and English translation thereof.

*Primary Examiner* — Michael Riegelman
(74) *Attorney, Agent, or Firm* — Squire Patton Boggs (US) LLP

(57) ABSTRACT

An oil suction device including a primary suction port installed at an inflow end of a thin pipe for sucking oil in an oil storing section, and a third suction port formed in a gap between a first tapered surface and a second papered surface due to a relative movement of the thin pipe to the thick pipe. At a suction pressure of the oil pump less than a predetermined pressure, the oil suction device sucks only oil from the primary suction port, and at a suction pressure of the oil pump equal to or more than the predetermined pressure, air is sucked from the third suction port formed in a gap between the first tapered surface and a second tapered surface due to the relative movement of the thin pipe to the thick pipe.

4 Claims, 7 Drawing Sheets

(52) U.S. Cl.
CPC .... *F16H 57/0436* (2013.01); *F04C 2210/206* (2013.01); *F04C 2270/03* (2013.01)

(56) References Cited

U.S. PATENT DOCUMENTS

| | | | | |
|---|---|---|---|---|
| 5,176,174 | A * | 1/1993 | Toraason | G05D 9/02 137/590 |
| 7,503,753 | B2 * | 3/2009 | Yasui | F01M 1/16 417/380 |
| 7,654,241 | B2 * | 2/2010 | Kobayashi | F01M 5/001 123/195 C |
| 8,020,665 | B2 * | 9/2011 | Sheridan | F01D 25/18 184/6.12 |
| 8,272,480 | B2 * | 9/2012 | Jensen | B01D 35/027 123/196 A |
| 8,651,239 | B2 * | 2/2014 | Aida | F16H 57/0408 184/6.12 |
| 9,151,186 | B2 * | 10/2015 | Meusel | F01L 1/047 |
| 9,458,923 | B2 * | 10/2016 | Poster | F16H 57/027 |
| 2014/0166401 | A1 * | 6/2014 | Kubota | F16H 57/0404 184/6.2 |
| 2014/0356195 | A1 * | 12/2014 | Tojo | F04C 15/066 417/222.2 |

FOREIGN PATENT DOCUMENTS

| | | |
|---|---|---|
| JP | 09-236248 A | 9/1997 |
| JP | 2002-310315 A | 10/2002 |
| JP | 2005-207357 A | 8/2005 |
| JP | 2006-266208 A | 10/2006 |
| JP | 2007-064125 A | 3/2007 |

* cited by examiner

OIL SUCTION DEVICE FOR VEHICLE

TECHNICAL FIELD

The present invention relates to an oil suction device for a vehicle provided with a mechanical oil pump driven by a rotation transmitted from a driving source of the vehicle such as an engine.

BACKGROUND ART

A transmission mounted on a vehicle has, as a conventional oil pump used for transferring oil (lubricating oil or hydraulic fluid) for lubricating and cooling a gear and a rotation shaft, a mechanical oil pump (gear pump) driven by a rotation transmitted from a driving source of a vehicle such as an engine. In a design of this kind of oil pump, a flow rate of oil with safety factor is set from past records and experience values so as to secure a required flow rate in a rotation range lower than a specified rotational speed. Therefore, in a high rotation range exceeding the specified rotational speed, the oil pump pumps up a flow rate of oil higher than required. Therefore, in such mechanical oil pump, redundant driving torque (pump driving force) occurs in the high rotation range exceeding the specified rotational speed. And such driving torque has been a loss to the driving source such as the engine. In this regard, as a mechanism for reducing the driving torque of the mechanical oil pump, a mechanism for changing a flow rate and a mechanism for reducing a pump rotational speed are commonly applied. As the mechanism for changing the flow rate, for example, Patent document 1 proposes a mechanism having a combination of a hydraulic pressure sensitive spool valve and a relief circuit (a variable flow rate pump with a relief circuit). Further, as the mechanism for controlling the pump rotational speed, for example, Patent document 2 proposes the mechanism for reducing the pump rotational speed via a planetary gear.

However, the above-mentioned variable flow rate pump with the relief circuit has many component parts, requiring a high degree of dimensional accuracy. This might complicate a structure and leads to an increase in weight and cost. In addition, such complicated structure entails a problem of resistance to micro foreign substances (contamination) such as metal powders contained in the oil. Further, the mechanism for reducing an input rotational speed of the pump using the planetary gear has a problem that a complicated structure of the mechanism may upsize such mechanism having the planetary gear.

RELATED ART DOCUMENTS

Patent Documents

[Patent document 1] Japanese Unexamined Patent Application Publication No. 7-233787
[Patent document 2] Japanese Unexamined Patent Application Publication No. 2005-207357

DISCLOSURE OF THE INVENTION

Problems to be Solved by the Invention

The present invention was made in view of point of the above-mentioned, and the purpose is to provide an oil suction device having a simple configuration with a minimized piece-part count that can reduce driving torque of a mechanical oil pump driven by a rotation transmitted from a driving source of a vehicle and effectively reduce a loss given to the driving source.

Means of Solving the Problems

In order to solve the above-mentioned problem, an oil suction device (1) for a vehicle in accordance with the present invention includes a mechanical oil pump (10) and a suction pipe (30, 31, 41). The mechanical oil pump (10) is driven by a rotation transmitted from a driving source of the vehicle. The suction pipe (30, 31, 41) is connected to a suction end (10a) side of the oil pump (10) and sucks oil in an oil storing section (20). The oil suction device (1) also includes a primary suction port (51) and a secondary suction port (52). The primary suction port (51) is installed at an inflow end (41a) of the suction pipe (30, 31, 41) and sucks the oil in the oil storing section (20). The secondary suction port (52) is installed on a downstream side of the first suction port (51) of the suction pipe (30, 31, 41). The oil suction device (1) is configured to switch two states depending on an oil level (L) of the oil storing section (20) in relation to the secondary suction port (52). One is a first state of sucking operation in which only the oil in the oil storing section (20) is sucked from the primary suction port (51) and the secondary suction port (52). The other is a second state of sucking operation in which the oil in the oil storing section (20) is sucked from the primary suction port (51) and air is sucked from the secondary suction port (52).

In addition, in the above-mentioned oil suction device for the vehicle, the suction pipe (30) includes a first suction pipe (31) and a second suction pipe (41). The first suction pipe (31) has an outflow end (31b) connected to the oil pump (10). The second suction pipe (41) is relatively movably arranged to an inflow end (31a) of the first the suction pipe (31). A first tapered surface (32) inclined to a longitudinal direction of the first suction pipe (31) is formed on an inner surface of the inflow end (31a) of the first suction pipe (31). A second tapered surface (42) contacting with the first tapered surface (32) of the first suction pipe (31) is formed on an outer surface of an outflow end (41b) of the second suction pipe (41). At a suction pressure of the oil pump (10) exceeding a predetermined pressure, the second suction pipe (41) moves relatively to the first suction pipe (31), thereby forming a third suction port (53) in a gap between the first tapered surface (32) and the second tapered surface (42). Thus, the oil suction device may be configured to establish a third state of sucking operation in which air is sucked from the third suction port (53) either in the first state of sucking operation or in the second state of sucking operation.

Further, the oil suction device (1) for the vehicle in accordance with the present invention includes the oil pump (10) and the suction pipe (30, 31, 41). The oil pump (10) is the mechanical oil pump driven by the rotation transmitted from the driving source of the vehicle. The suction pipe (30, 31, 41) is connected to the suction end (10a) side of the oil pump (10) and sucks the oil in the oil storing section (20). The suction pipe (30, 31, 41) includes the first suction pipe (31), the second suction pipe (41), the first tapered surface (32), the second tapered surface (42), the primary suction port (51) and the third suction port (53). The first suction pipe (31) has the outflow end (31b) connected to the oil pump (10). The second suction pipe (41) is relatively movably arranged to the inflow end (31a) of the first suction pipe (31). The first tapered surface (32) is formed on the inner surface of the inflow end (31a) of the first suction pipe (31) and inclined to the longitudinal direction of the first suction pipe (31). The second tapered surface (42) is formed on the outer surface of the outflow end (41b) of the second suction pipe (41) and contacts with the first tapered surface (32). The primary suction port (51) is installed at the inflow end (41a) of the second suction pipe (41) and sucks the oil in the oil storing section (20). The third suction port (53) is formed in the gap between the first tapered surface (32) and the second tapered surface (42). The gap is formed due to the relative movement of the second suction pipe (41) to the first suction pipe (31). At a suction pressure of the oil pump (10) less than the predetermined pressure establishes the first state of sucking operation in which only the oil in the oil storing section (20) is sucked from the primary suction port (51). At a suction pressure of the oil pump (10) equal to or more than the predetermined pressure, the second suction pipe (41) moves relatively to the first suction pipe (31), thereby forming the third suction port (53) in the gap between the first tapered surface (32) and the second tapered surface (42). This establishes the third state of sucking operation in which the air is sucked from the third suction port (53) in the first state of sucking operation.

In addition, the above-described oil suction device for the vehicle includes the secondary suction port (52) installed on the downstream side of the primary suction port (51) of the second suction pipe (41). At an oil level (L) of the oil storing section (20) lower than the secondary suction port (52), the oil suction device should be configured to establish the second state of sucking operation in which the air is sucked from the secondary suction port (52) in the first state of sucking operation or in the third state of sucking operation.

The oil suction device for the vehicle in accordance with the present invention is provided, as a mechanism for changing a distribution of an amount of oil sucked from the oil storing section and an amount of sucked air, with the above-described secondary suction port or the third suction port in a section in which the oil is sucked from the oil storing section into the oil pump. Thus, the oil suction device is configured to cause the oil pump to suck the air and accordingly reduce driving torque thereof. This can specifically reduce pump driving torque for a surplus discharge in a high rotation range exceeding a specified rotational speed. Therefore, the oil suction device can reduce the driving torque of the driving source that transmits the rotation to the oil pump and effectively reduce a loss given to the driving source.

The above-described secondary suction port is configured to adjust, according to an oil level in the oil storing section, whether the air is sucked into the oil pump and the sucked air amount if the air is sucked. Therefore, when most of the oil in the oil storing section is sucked to a lower oil level in the high rotation range of the oil pump, the oil suction device can mix the air with the oil to be sucked into the oil pump. Therefore, this can restrain an increase in sucked oil amount in the high rotation range of the oil pump, allowing to achieve an effect of reduction in pump driving force and an effect of reduction in pump suction negative pressure. Consequently, the driving torque of the driving source can be reduced with a simple configuration.

Further, at a suction pressure of the oil pump equal to or more than the predetermined pressure, the third suction port is formed, so as to suck the air, in the gap between the first suction pipe and the second suction pipe, which are installed separately. Due to this, at a high suction pressure along with a high rotational speed of the oil pump, the oil suction device can mix the air sucked from the third suction port with the oil sucked into the oil pump. Therefore, the oil suction device can restrain an increase in sucked oil amount in the high rotation range of the oil pump, achieving the effect of reduction in pump driving force and the effect of reduction in pump suction negative pressure. This can reduce the driving torque of the driving source with a simple configuration. It should be noted that the bracketed reference numerals are examples of the elements of the embodiment described later.

Effects of the Invention

The oil suction device in accordance with the present invention can reduce the driving torque of the mechanical oil pump driven by the rotation transmitted from the driving source of the vehicle, and effectively reduce the loss given to the driving source, with a simple configuration with a small number of component parts.

MODE FOR CARRYING OUT THE INVENTION

Figure 1A:
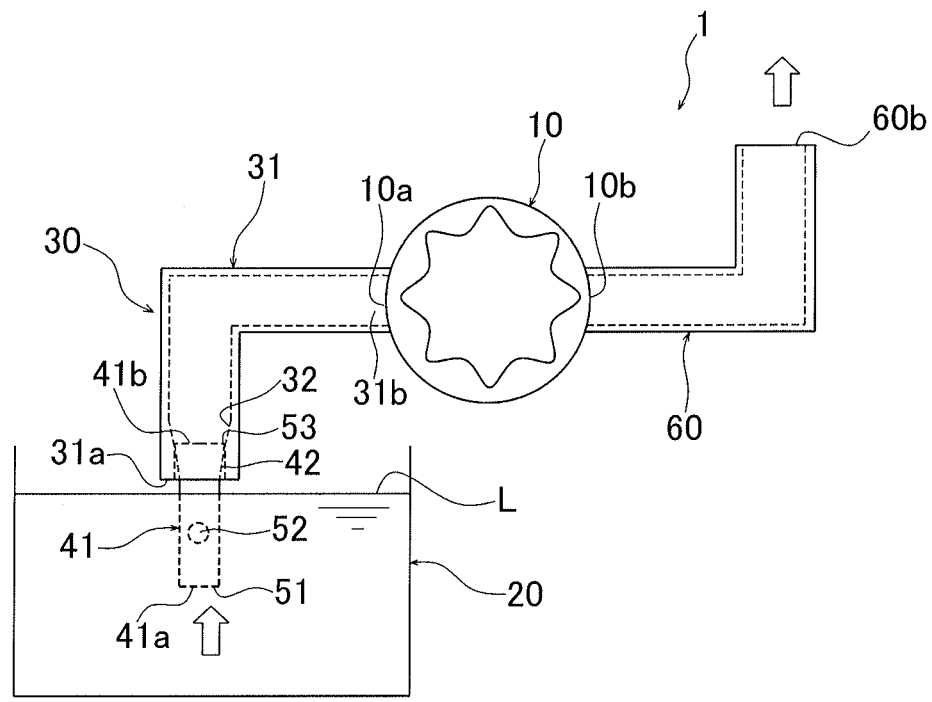
FIG. 1A and FIG. 1B are views illustrating a configuration of an oil suction device according to one embodiment of the present invention.
Figure 1B:
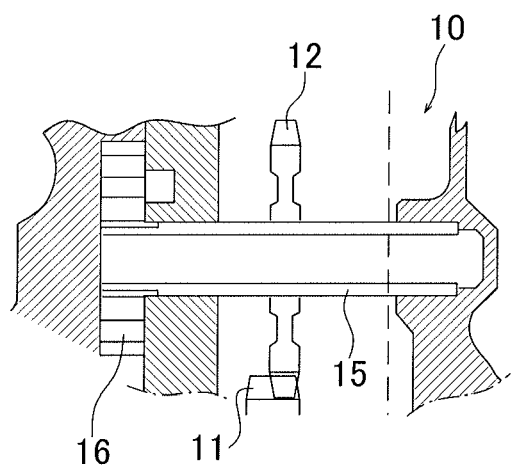

An embodiment of the present invention will now be described in detail with reference to the accompanying drawings. FIG. 1A and FIG. 1B are views illustrating a configuration of an oil suction device according to one embodiment of the present invention, of which FIG. 1A is a schematic diagram of a whole of the oil suction device, and FIG. 1B is a schematic side sectional view of an oil pump. As shown in the FIG. 1A, the oil suction device 1 includes a mechanical oil pump 10, a suction pipe 30 and a discharge pipe 60. The mechanical oil pump 10 is driven by a rotation transmitted from an engine (not shown in the figure) that is a driving source of a vehicle. The suction pipe 30 is connected to a suction end 10a side of the oil pump 10 and sucks oil in an oil bath (oil storing section) 20. The discharge pipe 60 is connected to a discharge end 10b side of the oil pump 10.

The oil pump 10 is used for transferring hydraulic fluid (oil) for lubricating and cooling a mechanical structure such as gears in a transmission for the vehicle. As shown in FIG. 1B, this oil pump 10 includes a drive gear 11, a pump shaft (rotation shaft) 15 and a pump section 16. To the drive gear 11, a rotation of a crank shaft (not shown in the figure) that rotates by means of a driving force of the engine is transmitted. The pump shaft (rotation shaft) 15 is provided with a driven gear 12 for meshing with a drive gear 11. The pump section 16 forcibly feeds oil due to a rotation of the pump shaft 15. The pump section 16 is a positive displacement trochoid pump. In this oil pump 10, an amount of the oil forcibly fed by the pump section 16 is configured to increase and decrease depending on an increase or decrease in rotation transmitted from the engine.

As shown in FIG. 1A, the suction pipe 30 includes a thick pipe (first suction pipe) 31 and a thin pipe (second suction pipe) 41. An outflow end 31b of the thick pipe 31 is connected to the oil pump 10. The thin pipe 41 is relatively movably arranged to an inflow end 31a of the thick pipe 31. The inflow end 31a of the thick pipe 31, a vicinity thereof and the whole thin pipe 41 are arranged so that an axial direction (passage direction) of these component parts is in an up and down direction (vertical direction). And, on an inner peripheral surface of the inflow end 31a of the thick pipe 31, a first tapered surface 32 inclined to a longitudinal direction of the thick pipe 31 is formed. On an outer peripheral surface of an outflow end 41b of the thin pip 41, a second tapered surface 42 is formed, contacting with the first tapered surface 32 of the thick pipe 31. Both of the first tapered surface 32 and the second tapered surface 42 are formed in a shape of an outer peripheral surface of a circular cone that is inclined, gradually increasing in diameter from an upstream side toward a downstream side of an oil flow in the suction pipe 30. In other words, the suction pipe 30 provided by the oil suction device 1 of the present embodiment includes two pipes, namely the thin pipe 41 and the thick pipe 31, and is structured so that the contact between the first tapered surface 32 and the second tapered surface 42 allows the both pipes to be relatively movable and disallows the thin pipe 41 to be pulled out from the thick pipe 31.

In addition, the above-described suction pipe 30 is provided with a primary suction port 51, a secondary suction port 52 and a third suction port 53. The primary suction port 51 is installed at the inflow end 41a of the thin pipe 41 and sucks the oil in the oil bath 20. The secondary suction port 52 is installed on a downstream side of the primary suction port 51 on the side surface of the thin pipe 41. The thin pipe 41 slides parallel to the thick pipe 31, thereby forming the third suction port 53 in a gap between the first tapered surface 32 and the second tapered surface 42.

The secondary suction port 52 is arranged at a substantially center position in a longitudinal direction of the thin pipe 41. At a position lower than an oil level L of the oil bath 20 (where the secondary suction port 52 is immersed in oil), on one hand, this secondary suction port 52 sucks the oil in the oil bath 20. At a position higher than the oil level L of the oil bath 20 (where the secondary suction port 52 is exposed above the oil surface), on the other hand, the secondary suction port 52 sucks air. In other words, in the oil suction device 1 of the present embodiment, two states are configured to switch depending on the oil level L of the oil bath 20 in relation to the secondary suction port 52. One is a first state of sucking operation in which the oil in the oil bath 20 is sucked from both of the primary suction port 51 and the secondary suction port 52. The other is a second state of sucking operation in which the oil in the oil bath 20 is sucked from the primary suction port 51 while the air is sucked from the secondary suction port 52.

Further, in the oil suction device 1 of this embodiment, the thin pipe 41 moves to an upper direction due to a suction pressure of the oil pump 10 exceeding a predetermined pressure, thereby allowing the third suction port 53 formed in the gap between the thick pipe 31 and the thin pipe 41 (between the first tapered surface 32 and second tapered surface 42) to suck the air. In other words, the suction pipe 30 provided by the oil suction device 1 of the present embodiment is structured to control a sucked oil amount (mixed air amount) in a following way. Namely, the suction pipe 30 causes a slide stroke amount of the thin pipe 41 and a gap amount at a joint (third suction port 53) between the thin pipe 41 and the thick pipe 31 to respond to a suction pressure of the oil pump 10 (suction pipe 30), thereby allowing to change a distribution rate between an amount of oil sucked from the oil bath 20 and a sucked air amount.

Specifically, on one hand, in a range in which a suction pressure P (P>0) of the oil pump 10 is lower than a predetermined pressure $P_0$ (P<$P_0$), the thin pipe 41 is at a position lowered from the thick pipe 31. Hereinafter, this position is referred to as "lowered position." In this state, the first tapered surface 32 and the second tapered surface 42 are surface-contacted with each other, and the third suction port 53 to be formed in the gap between the thick pipe 31 and the thin pipe 41 remains closed. On the other hand, in a range (P≥$P_0$) in which the suction pressure P (P>0) of the oil pump 10 is equal to or more than the predetermined pressure $P_0$, the thin pipe 41 is at a lifted position from the thick pipe 31 as the thin pipe 41 is lifted by the suction pressure of the oil pump 10. Hereinafter, this position is referred to as "lifted position." In this state, the first tapered surface 32 and the second tapered surface 42 are spaced from each other, thereby leading to a state in which the third suction port 53 formed in the gap between the thick pipe 31 and the thin pipe 41 is open. Consequently, the air is sucked from the third suction port 53.

Figure 2:
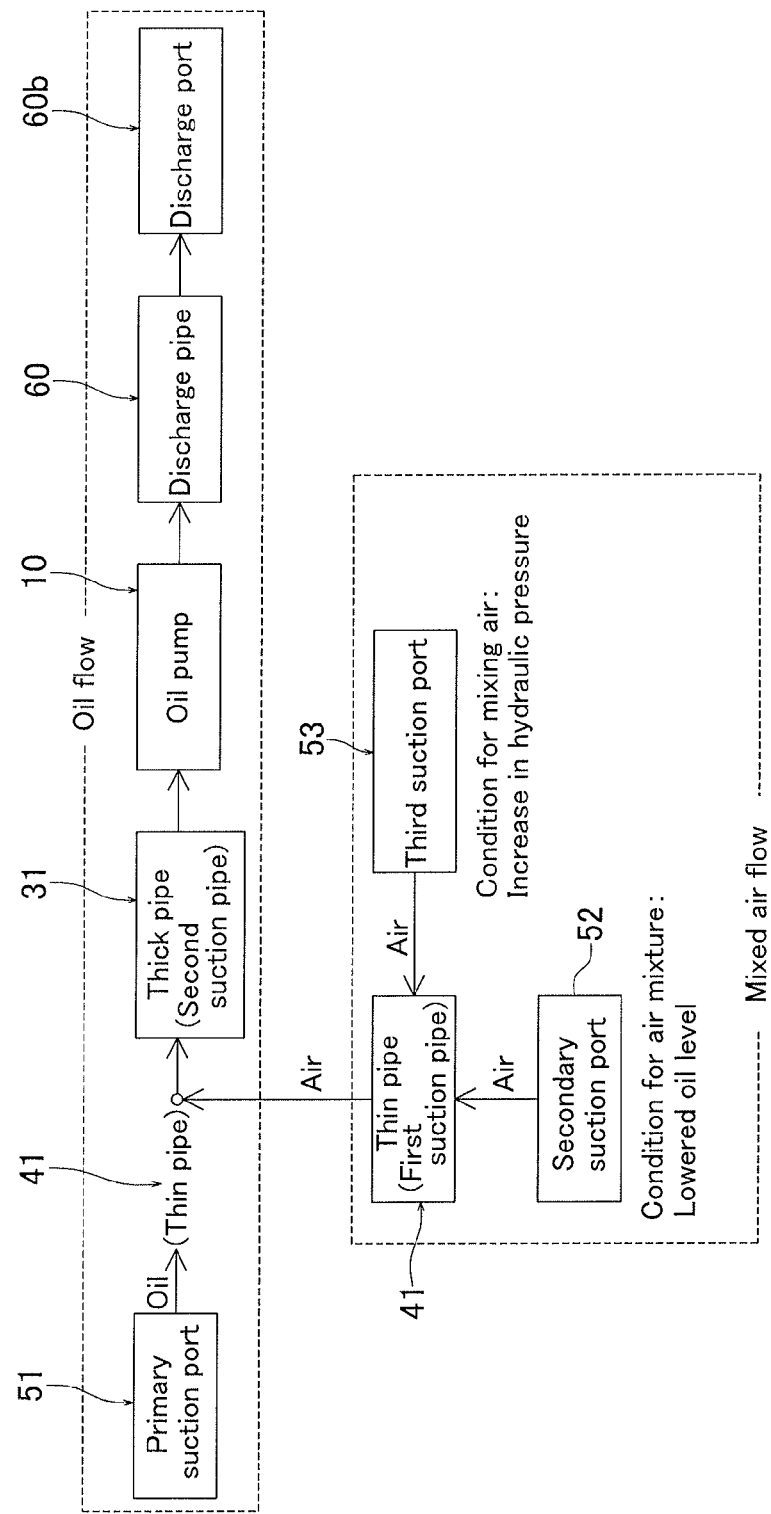
FIG. 2 is a diagram illustrating flows of oil and air in an oil suction device.

FIG. 2 is a diagram illustrating flows of oil and air in the oil suction device. In the oil suction device 1 of the present embodiment, the oil is sucked from the primary suction port 51 due to a drive of the oil pump 10. This oil is derived into the discharge pipe 60 via the oil pump 10 from the thin pipe 41 and the thick pipe 31 and then drained from a discharge port 60b. In FIG. 2, the flow of the oil sucked from this primary suction port 51 is referred to as "oil flow." On the other hand, in the oil suction device 1, if the oil level L of the oil bath 20 is lowered below the secondary suction port 52, and thus the secondary suction port 52 is exposed above the oil level of the oil bath 20, air is sucked from the secondary suction port 52. This air is introduced into the oil pump 10 via the thick pipe 31 from the thin pipe 41, derived to the discharge pipe 60 from the oil pump 10 and finally drained from the discharge port 60b. In addition, if the suction pressure of the oil pump 10 rises, the thin pipe 41 slides parallel to the thick pipe 31 and moves to the above-described lifted position. Accordingly, the third suction port 53 opens to suck the air. Similar to the air sucked from the secondary suction port 52, the air sucked from the third suction port 53 is introduced into the oil pump 10 via the thick pipe 31 from the thin pipe 41, derived from the oil pump 10 into the discharge pipe 60 and finally drained from the discharge port 60b. In FIG. 2, the flow of the air sucked from the secondary suction port 52 and the third suction port 53 is referred to as "mixed air flow." Via such mixed air flow, the oil suction device 1 of the present embodiment mixes the air with the oil sucked into the oil pump 10, thereby allowing to restrain a sucked oil amount and thus reduce a hydraulic power of the oil pump 10.

As a state in which the oil in the oil bath 20 is sucked, the oil suction device 1 of the above-described configuration can apply one of the three states: the first state of sucking operation in which only the oil is sucked from the primary suction port 51 or the secondary suction port 52, the second state of sucking operation in which the oil is sucked from the primary suction port 51 while the air is sucked from the secondary suction port 52, and the third state of sucking operation in which the air is further sucked from the third suction port 53 either in the first sate of sucking operation or the second state of sucking operation. In this way, mixing the air sucked from the secondary suction port 52 and the third suction port 53 with the oil sucked from the primary suction port 51 can hold the sucked oil amount for a rotational speed of the oil pump 10 particularly in the high rotation range low, and can effectively reduce a drive loss of the oil pump 10. Each of the above-described sates of sucking operation will be described below.

Figure 3:
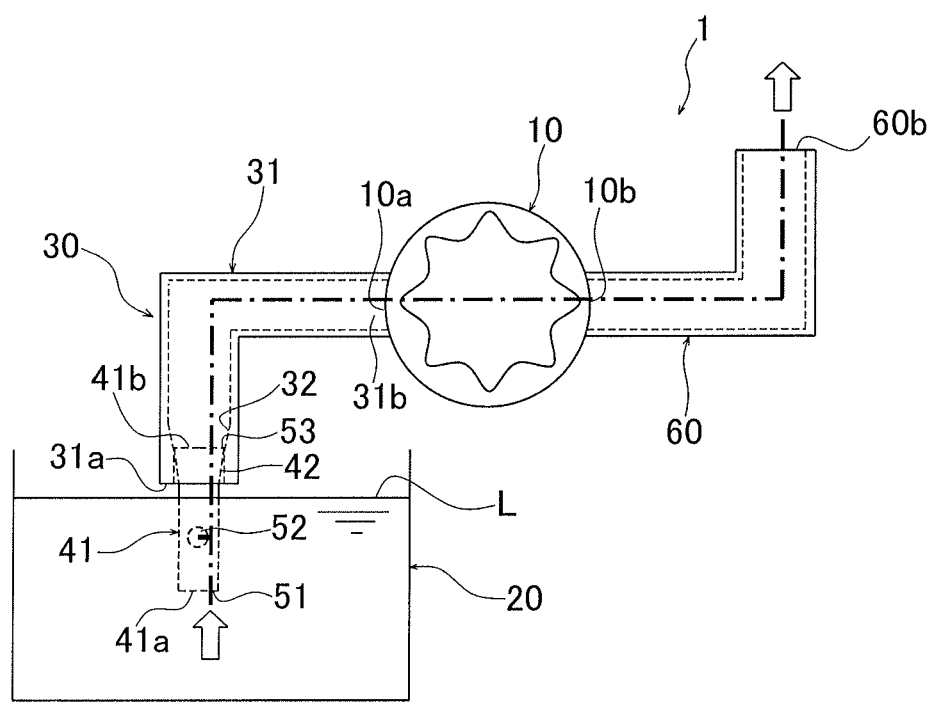
FIG. 3 is a view illustrating a first state of sucking operation of an oil suction device.

FIG. 3 is a view illustrating the first state of sucking operation of the oil suction device 1. In this figure, the flow of the oil sucked from the primary suction port 51 and the secondary suction port 52 is shown in a dash line. In the first state of sucking operation shown in the same figure, the oil level L of the oil bath 20 is at a position higher than the secondary suction port 52, whereby the secondary suction port 52 is immersed in the oil. In addition, since the suction pressure of the oil pump 10 is in the range ($P<P_0$) lower than the above-mentioned predetermined pressure $P_0$, the thin pipe 41 is at the lowered position from the thick pipe 31. This holds the third suction port 53 formed in the gap between the thick pipe 31 and the thin pipe 41 closed. Therefore, due to the drive of the oil pump 10, only the oil is sucked from the primary suction port 51 and the secondary suction port 52, but no air is sucked from the third suction port 53. In this first state of sucking operation, no air is sucked into the oil pump 10, thereby achieving a linear increase in oil flow rate being almost directly proportional to the rotational speed of the oil pump 10.

Figure 4:
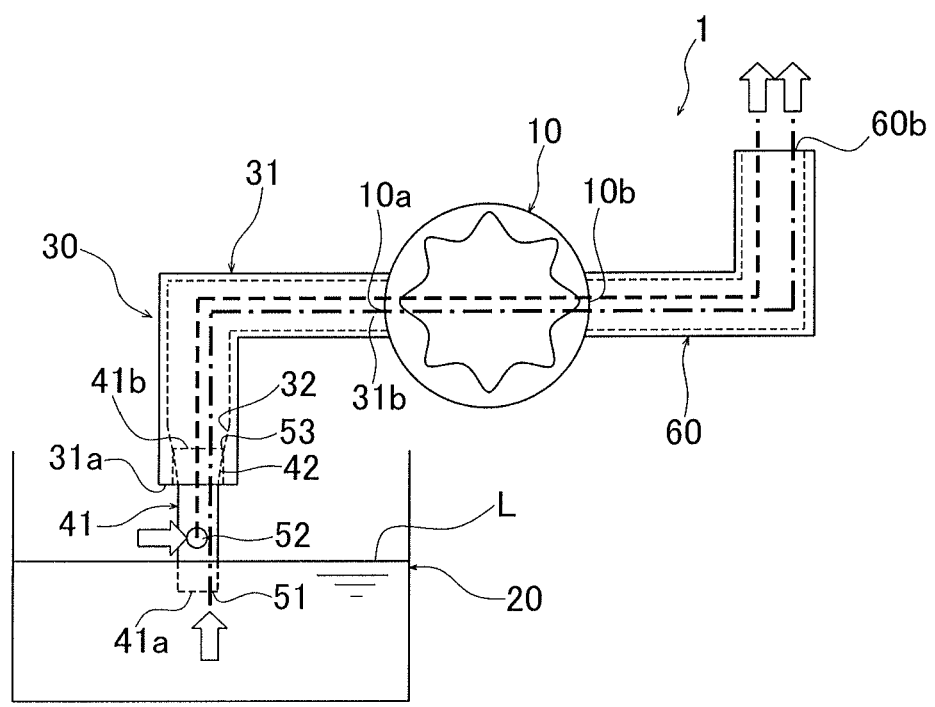
FIG. 4 is a view illustrating a second state of sucking operation of an oil suction device.

FIG. 4 is a view illustrating the second state of sucking operation of the oil pump 10. In this figure, the flow of the oil sucked from the primary suction port 51 is shown in a dash line, and the flow of the air sucked from the secondary suction port 52 is shown in a dotted line. In the second state of sucking operation shown in the figure, on one hand, the oil level L of the oil bath 20 is at a position lower than the secondary suction port 52, whereby the secondary suction port 52 is exposed above the oil level. On the other hand, the oil level L is at a position higher than the primary suction port 51, whereby the primary suction port 51 is immersed in the oil. In addition, at the suction pressure of the oil pump 10 in the range lower than the above-mentioned predetermined pressure $P_0$ ($P<P_0$), the thin pipe 41 is at the lowered position. This holds the third suction port 53 closed. Therefore, due to the drive of the oil pump 10, the oil is sucked from the primary suction port 5 while the air is sucked from the secondary suction port 52. Mixing the air sucked from the secondary suction port 52 into the oil pump 10 can restrain an increase in pump negative pressure and pump driving force (in comparison with the state in which no air is mixed).

Figure 5:
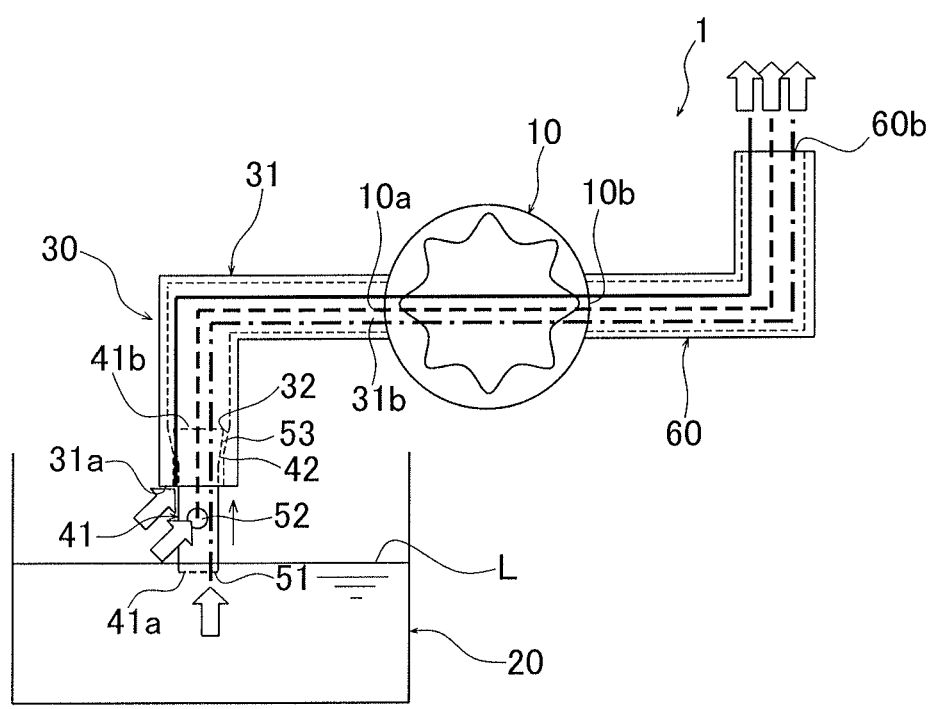
FIG. 5 is a view illustrating a third state of sucking operation of an oil suction device.

FIG. 5 is a view illustrating the third state of sucking operation of the oil pump 10. In this figure, the flow of the oil sucked from the primary suction port 51 is shown in a dash line, the flow of the air sucked from the secondary suction port 52 is shown in a dotted line, and the flow of the air sucked from the third suction port 53 is shown in a solid line. In the third state of sucking operation shown in the figure, since the suction pressure of the oil pump 10 is in the range equal to or more than the above-mentioned predetermined pressure $P_0$ ($P \geq P_0$), the thin pipe 41 is at the lifted position. This holds the third suction port 53 open.

Further, in this third state of sucking operation, as well as the second state of sucking operation, the oil level L of the oil bath 20 is at a position lower than the secondary suction port 52, and thus the secondary suction port 52 is exposed above the oil level. On the other hand, the oil level L is at a position higher than the primary suction port 51, and thus the primary suction port 51 is immersed in the oil. Therefore, due to the drive of the oil pump 10, while the oil is sucked from the primary suction port 51, the air is sucked from the secondary suction port 52 and the third suction port 53. Thus, mixing a larger amount of air than the second state of sucking operation into the oil pump 10 can further restrain an increase in pump negative pressure and pump driving force.

It should be noted that in the third state of sucking operation, except the above-described configuration, the oil level L of the oil bath 20 may be at a position higher than the secondary suction port 52, where the secondary suction port 52 is immersed in the oil. In that case, due to the drive of the oil pump 10, the oil is sucked from the primary suction port 51 and the secondary suction port 52 while the air is sucked from the third suction port 53. Therefore, in this case, the air sucked from the secondary suction port 52 is mixed into the oil pump 10, thereby allowing to restrain an increase in pump negative pressure and pump driving force.

Figure 6:
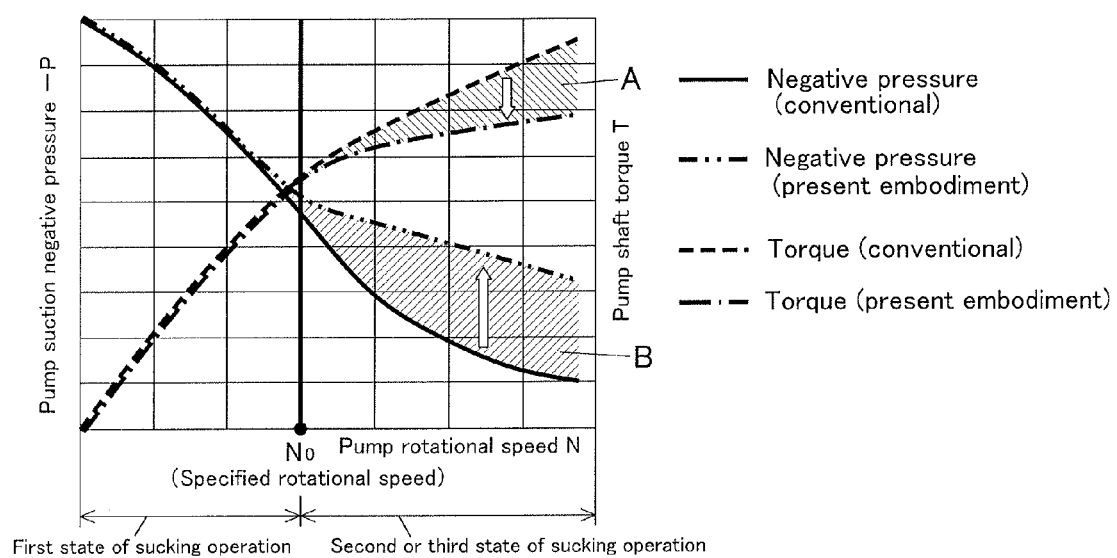
FIG. 6 is a graph illustrating a relation between a pump suction negative pressure and pump shaft torque (pump driving force) with respect to a rotational speed of an oil pump.

FIG. 6 is a graph illustrating a comparison between the oil suction device 1 of the present embodiment and an oil suction device of the conventional configuration, and a relation between a pump suction negative pressure $-P$ ($P>0$) and a pump driving force (pump shaft torque) T with respect to a rotational speed N of the oil pump 10. In the graph of the same figure, a pump suction negative pressure of the oil suction device 1 of the present embodiment is shown in a dashed-two dotted line, and a pump suction negative pressure of the oil suction device of the conventional configuration is shown in a solid line. In addition, pump shaft torque of the oil suction device 1 of the present embodiment is shown in a dash line, and pump shaft torque of the oil suction device of the conventional configuration is shown in a dotted line. Here, on one hand, the oil suction device of the conventional configuration is configured to suck only oil but no air from the suction port (suction port installed at a suction end of the suction pipe) corresponding to the primary suction port 51 of the present embodiment (namely, configured to include no suction port corresponding to the secondary suction port 52 and the third suction port 53).

On the other hand, in a range in which a rotational speed (rotational speed of the pump shaft 15) N is less than a specified rotational speed $N_0$, the oil pump 10 of the present embodiment is in the first state of sucking operation in which only oil is sucked from the primary suction port 51. And, in a range in which the rotational speed N is equal to or more than the specified rotational speed $N_0$, the oil pump 10 is (mixed air state) in the second state of sucking operation or the third state of sucking operation in which that the air sucked from the secondary suction port 52 or the third suction port 53 is mixed into the oil sucked from the primary suction port 51. Thus, as shown in the graph of the FIG. 6, the oil suction device 1 of the present embodiment can restrain an increase in sucked oil amount in the high rotation range equal to or more than the specified rotational speed $N_0$ (or hold an increase rate low), in comparison with the oil suction device of the conventional configuration. Therefore, an effect of reduction in pump driving force and an effect of reduction in pump suction negative pressure can be achieved. In other words, in the oil suction device 1 of the present embodiment, the pump driving force decreases by a domain A on the graph, and the pump suction negative pressure decreases by a domain B on the graph, in comparison with the oil suction device of the conventional configuration.

Figure 7:
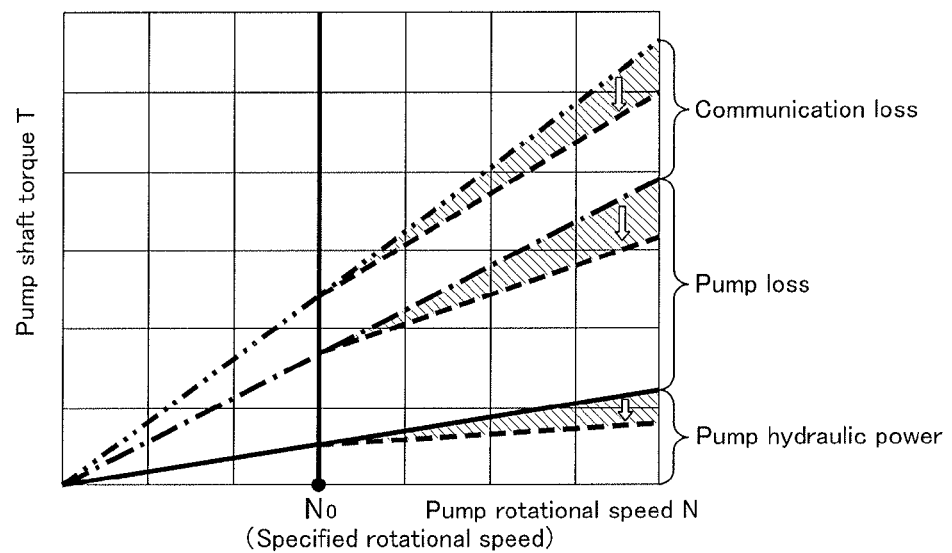
FIG. 7 is a graph illustrating a relation between a pump hydraulic power, a pump loss and a communication loss with respect to a rotational speed of an oil pump.

FIG. 7 is a graph illustrating a comparison between the oil suction device 1 of the present embodiment and the oil suction device of the conventional configuration. This shows a relation between a pump hydraulic power, a pump loss and a communication loss in relation to a rotational speed of the oil pump 10. In the graph of the same figure, the pump hydraulic power, single pump torque (the pump loss) and the communication torque of the oil suction device 1 of the present embodiment are respectively shown in a solid line, a dash line and a dashed-two dotted line. Further, changes in pump hydraulic power, pump single pump torque and communication torque of the oil suction device of the conventional configuration are shown in a dotted line. It should be noted that the oil suction device of the conventional configuration here is similar to that of FIG. 6. In the oil suction device 1 of the present embodiment, in the high rotation range in which the rotational speed N of the oil pump 10 is equal to or higher than the specified rotational speed ($N_0$), air is sucked from the secondary suction port 52 or the third suction port 53 (or the mixed air state is established), whereby in comparison with the oil suction device of the conventional configuration, as shown in FIG. 7, the pump hydraulic power decreases. Furthermore, the decrease in pump hydraulic power reduces the single pump torque and the communication torque. This can reduce the pump loss and the communication loss.

As described above, in the oil suction device 1 of the present embodiment, the suction pipe 30 for sucking the oil in the oil bath 20 into the oil pump 10 has the thin pipe 41 and the thick pipe 31, which are installed separately, allowing the thin pipe 41 to be slide-movable in the thick pipe 31. On the basis thereof, if the thin pipe 41 moves depending on a suction pressure of the oil pump 10, the third suction port 53 is formed in the gap between the first tapered surface 32 of the thick pipe 31 and the second tapered surface 42 of the thin pipe 41. Further, the secondary suction port 52 is installed at a center position of the thin pipe 41 for sucking air. This allows to mix the air into the oil pump 10 depending on the oil level L of the oil bath 20 and the suction pressure of the oil pump 10.

Thus, as a mechanism for changing a distribution of an amount of oil sucked from the oil bath 20 and an amount of sucked air (a mechanism for sucking air and oil separately), installing the above-described secondary suction port 52 and the above-described third suction port 53 in a section in which the oil in the oil bath 20 is sucked into the oil pump 10. This allows air to be sucked into the oil pump 10, whereby the driving torque can be reduced intentionally. In other words, installing the secondary suction port 52 for sucking air into a suction path of the oil pump 10, and further installing the third suction port 53 between the thick pipe 31 and the thin pipe 41 can regulate a surplus amount of sucked oil of the oil pump 10 and reduce the torque required for the drive of the oil pump 10. This can specifically reduce the pump driving torque for a surplus discharge in the high rotation range exceeding the specified rotational speed. As a result, the driving torque of the engine (driving source) driving the oil pump 10 can be effectively reduced.

While the embodiment of the invention has been described, it is to be understood that the invention is not limited to the foregoing embodiment. Rather, the invention can be modified to incorporate any number of variations or alterations within the scope of claims and the scope of technical concept described in the specification and the drawings thereof. For example, while the oil suction device 1 of the above-described embodiment includes both of the secondary suction port 52 and the third suction port 53, the embodiment of the oil suction device in accordance with the present invention may be provided with either one of the above-described secondary suction port 52 or the above-described third suction port 53. If only the secondary suction port 52 is installed, the suction pipe 30 has no need to include the two pipes, which are the above-described thick pipe 31 and the above-described thin pipe 41, but may be structured only by a single pipe.

In addition, the specific structure of the third suction port 53 is one example. As far as the third suction port 53 is structured to be switchable between opening and closing depending on a suction pressure of the oil pump 10, the third suction port 53 may have another structure except the above-described one formed in the gap between the tapered surfaces 32, 42.

The invention claimed is:

1. An oil suction device for a vehicle comprising:
   a mechanical oil pump driven by a rotation transmitted from a driving source of the vehicle; and
   a suction pipe connected to a suction end side of the oil pump, the suction pipe for sucking oil in an oil storing section,
   wherein the suction pipe comprises:
   a first suction pipe having an outflow end connected to the oil pump;
   a second suction pipe relatively movably arranged to the first suction pipe;
   a first suction port installed at an inflow end of the second suction pipe, the first suction port for sucking oil in the oil storing section; and
   a second suction port installed on a downstream side of the first suction port of the second suction pipe, and
   wherein a first state of sucking operation for sucking only oil in the oil storing section from the first suction port and the second suction port, a second state of sucking operation for sucking oil in the oil storing section from the first suction port and air from the second suction port, and a third state of sucking operation for sucking air from a third suction port either in the first state of sucking operation or in the second state of sucking operation, the third suction port formed due to a relative movement of the second suction pipe to the first suction pipe at a suction pressure of the oil pump exceeding a predetermined pressure, the first state of sucking operation, the second state of sucking operation and the third state of sucking operation switch depending on an oil level of the oil storing section in relation to the second suction port.

2. The oil suction device for the vehicle according to claim 1,
   wherein a first tapered surface inclined to a longitudinal direction of the first suction pipe is formed on an inner surface of the inflow end of the first suction pipe, and a second tapered surface contacting with the first tapered surface of the first suction pipe is formed on an outer surface of the outflow end of the second suction pipe, and
   wherein in the third state of sucking operation, the third suction port is formed in a gap between the first tapered surface and the second tapered surface.

3. An oil suction device for a vehicle, comprising:
   a mechanical oil pump driven by a rotation transmitted from a driving source of the vehicle; and
   a suction pipe connected to a suction end side of the oil pump, suction pipe for sucking oil in an oil storing section, wherein the suction pipe comprises:

a first suction pipe having an outflow end connected to the oil pump;

a second suction pipe relatively movably arranged to an inflow end of the first suction pipe a first tapered surface formed on an inner surface of the inflow end of the first suction pipe and inclined to a longitudinal direction of the first suction pipe;

a second tapered surface formed on an outer surface of an outflow end of the second suction pipe and contacting with the first tapered surface;

a first suction port installed at an inflow end of the second suction pipe, the first suction port for sucking oil in the oil storing section; and a second suction port formed in a gap between the first tapered surface and the second tapered surface formed due to a relative movement of the second suction pipe to the first suction pipe, and wherein at a suction pressure of the oil pump less than a predetermined pressure, the first state of sucking operation for sucking only oil in the oil storing section from the first suction port is established, and at a suction pressure of the oil pump equal to or more than the predetermined pressure, the second suction pipe moves relatively to the first suction pipe to form the second suction port in the gap between the first tapered surface and the second tapered surface, whereby a second state of sucking operation for sucking air from the second suction port is established in the first state of sucking operation.

4. The oil suction device for the vehicle according to claim 3, the oil suction device comprising a third suction port installed on an upstream side of the first suction port of the second suction pipe, wherein at an oil level of the oil storing section lower than the first suction port, a third state of sucking operation for sucking air from the third suction port is established in the first state of sucking operation or in the second state of sucking operation.

\* \* \* \* \*